US009767074B2

(12) United States Patent
Song et al.

(10) Patent No.: US 9,767,074 B2
(45) Date of Patent: Sep. 19, 2017

(54) METHOD AND DEVICE FOR FAST FOURIER TRANSFORM

(71) Applicant: Montage Technology (Shanghai) Co., Ltd., Shanghai (CN)

(72) Inventors: Heming Song, Shanghai (CN); Lihua Wang, Shanghai (CN)

(73) Assignee: MONTAGE TECHNOLOGY (SHANGHAI) CO., LTD., Shanghai (CN)

( * ) Notice: Subject to any disclaimer, the term of this patent is extended or adjusted under 35 U.S.C. 154(b) by 135 days.

(21) Appl. No.: 14/709,436

(22) Filed: May 11, 2015

(65) Prior Publication Data
US 2016/0239463 A1    Aug. 18, 2016

(30) Foreign Application Priority Data

Feb. 13, 2015  (CN) .......................... 2015 1 0079003

(51) Int. Cl.
*G06F 17/10*  (2006.01)
*G06F 17/14*  (2006.01)

(52) U.S. Cl.
CPC ................................. *G06F 17/142* (2013.01)

(58) Field of Classification Search
None
See application file for complete search history.

(56) References Cited

U.S. PATENT DOCUMENTS

| 4,138,730 A * | 2/1979 | Ali .......................... H04J 4/005 708/404 |
| 4,970,674 A * | 11/1990 | White .................... G06F 17/142 708/404 |
| 6,434,583 B1 * | 8/2002 | Dapper ................... G06F 17/14 348/E7.07 |
| 2002/0178195 A1 * | 11/2002 | Ryu ....................... G06F 17/142 708/404 |
| 2003/0041080 A1 * | 2/2003 | Jaber ..................... G06F 17/142 708/404 |
| 2003/0195911 A1 * | 10/2003 | Buchert ................. G06F 17/144 708/405 |

(Continued)

OTHER PUBLICATIONS

Porat, Boaz, A course in digital signal processing,1997, pp. 142-155, John Wiley.

*Primary Examiner* — Michael D Yaary
(74) *Attorney, Agent, or Firm* — Oliff PLC

(57) ABSTRACT

A FFT/IFFT method, comprises converting a set of reversal-order or a set of natural-order addresses of FFT/IFFT data to a set of addresses in a radix-based numeral representation; calculating sequence numbers of a plurality of memory locations for buffering a set of data for a parallel calculation, by accumulating or subtracting all digits of the set of addresses in the radix-based numeral representation and then performing a modulo operation on the accumulation or subtraction results, wherein the radix represents a length of short DFT sequence for the parallel calculation in a FFT/IFFT calculation; storing the FFT/IFFT data simultaneously and respectively into corresponding memory locations indicated by the calculated sequence numbers; and performing FFT/IFFT calculation, comprising: performing short DFT sequence calculation; repeating the short DFT sequence calculation, until the whole FFT/IFFT calculation completes.

27 Claims, 9 Drawing Sheets

(56) References Cited

U.S. PATENT DOCUMENTS

2010/0128818 A1* 5/2010 Shepherd .............. G06F 17/142
　　　　　　　　　　　　　　　　　　　　375/316
2014/0122553 A1* 5/2014 Dehner ................. G06F 17/142
　　　　　　　　　　　　　　　　　　　　708/403

* cited by examiner

METHOD AND DEVICE FOR FAST FOURIER TRANSFORM

CROSS REFERENCE TO RELATED APPLICATION

This application claims priority to Chinese application No. 201510079003.3 entitled "Method and circuit for Fast Fourier Transform," filed on Feb. 13, 2015 by Montage Technology (Shanghai) Co., Ltd., which is incorporated herein by reference.

TECHNICAL FIELD

The present invention relates to data transform, and more particularly, but not limited to a method and a device for Fast Fourier Transform.

BACKGROUND

Discrete Fourier Transformation (DFT) calculations for large points usually adopt a butterfly architecture for Fast Fourier Transformation (FFT) calculations. The term "butterfly" appears in the context of the CooleyTukey FFT algorithm, which recursively breaks down a DFT of composite size n=rm into r smaller transforms of size m wherein r is the "radix" of the transform. These smaller DFTs are then combined via size-r butterflies, which themselves are DFTs of size r (performed m times on corresponding outputs of the sub-transforms) pre-multiplied by roots of unity.

In conventional arrangements, the order of the data does not follow any rule, and a series of reordering is needed to combine a correct order of butterfly calculation data. Further, for each butterfly calculation, the data are reordered according to the number of times of the current calculation. For a digital circuit implementation, the reorder operation is accomplished by a series of selecting control logics. Such structure consumes a lot of resources and the structure is located at a data critical path, which has a negative impact on the area and speed of the circuit, and even has a greater effect on the structure with limited line resources (such as in the Field Programmable Gate Array, FPGA design).

SUMMARY

A Fast Fourier Transform/Inverse Fast Fourier Transform (FFT/IFFT) method, comprises converting a set of reversal-order or a set of natural-order addresses of FFT/IFFT data to a set of addresses in a radix-based numeral representation; calculating sequence numbers of a plurality of memory locations for buffering a set of data for a parallel calculation, by accumulating or subtracting all digits of the set of addresses in the radix-based numeral representation and then performing a modulo on the accumulation or subtraction results, wherein the radix represents a length of short DFT sequence for the parallel calculation in a FFT/IFFT calculation; storing the FFT/IFFT data simultaneously and respectively into corresponding memory locations indicated by the calculated sequence numbers; and performing a FFT/IFFT calculation, comprising: performing a short DFT sequence calculation, comprising: retrieving corresponding data from the memory, inputting directly the corresponding data into a short DFT sequence calculator for calculation, modifying the calculated data with a modified twiddle factor, in-place storing the modified data back to the memory directly; repeating the short DFT sequence calculation, until the whole FFT/IFFT calculation completes.

A circuit for performing Fast Fourier Transform/Inverse Fast Fourier Transform (FFT/IFFT), comprises an address calculating unit, configured to convert a set of reversal-order or a set of natural-order addresses of FFT/IFFT data to a set of addresses in a radix-based numeral representation; wherein the address calculating unit is further configured to calculate sequence numbers of a plurality of memory locations for buffering a set of data for a parallel calculation, by accumulating or subtracting each digit of the set of addresses in the radix-based numeral representation and then preforming a modulo on the accumulation or subtraction results, wherein the radix represents a length of short DFT sequence for the parallel calculation in a FFT/IFFT calculation; an interface unit configured to store the FFT/IFFT data simultaneously and respectively into corresponding memory locations indicated by the calculated sequence numbers; and a FFT/IFFT calculation unit, configured to perform a FFT/IFFT calculation, comprising a short DFT sequence calculator configured to: retrieve corresponding data from the memory, directly perform a short DFT sequence calculation for the data, modify the calculated data with a modified twiddle factor, in-place store the modified data back to the memory directly; repeat the short DFT sequence calculation, until the whole FFT/IFFT calculation completes.

A receiver including circuit for performing Fast Fourier Transform/Inverse Fast Fourier Transform (FFT/IFFT) according to any of the above circuit.

A signal generator including circuit for performing Fast Fourier Transform/Inverse Fast Fourier Transform (FFT/IFFT) according to any of the above circuit.

DESCRIPTION OF THE DRAWINGS

The present invention is illustrated in an exemplary manner by the accompanying drawings. The drawings should be understood as exemplary rather than limiting, as the scope of the invention is defined by the claims. In the drawings, the identical reference signs represent the same elements.

DETAILED DESCRIPTION

Various aspects and examples of the invention will now be described. The following description provides specific details for a thorough understanding and enabling description of these examples. Those skilled in the art will understand, however, that the invention may be practiced without many of these details. Additionally, some well-known structures or functions may not be shown or described in detail, so as to avoid unnecessarily obscuring the relevant description.

First, the input data to be treated for FFT calculation are uniformly arranged in the corresponding memories. The data are arranged by, obtaining sequence number of the memories by performing $2^n$ modulo XOR (exclusive OR calculation) operations on the addresses of data (that is, the data addresses are moduloed by the radix (radix, also known as the "base"), and then the moduloed data are OXRed) or otherwise calculated, and inputting data into memories indicated by the corresponding sequence number of the memories.

Figure 1:
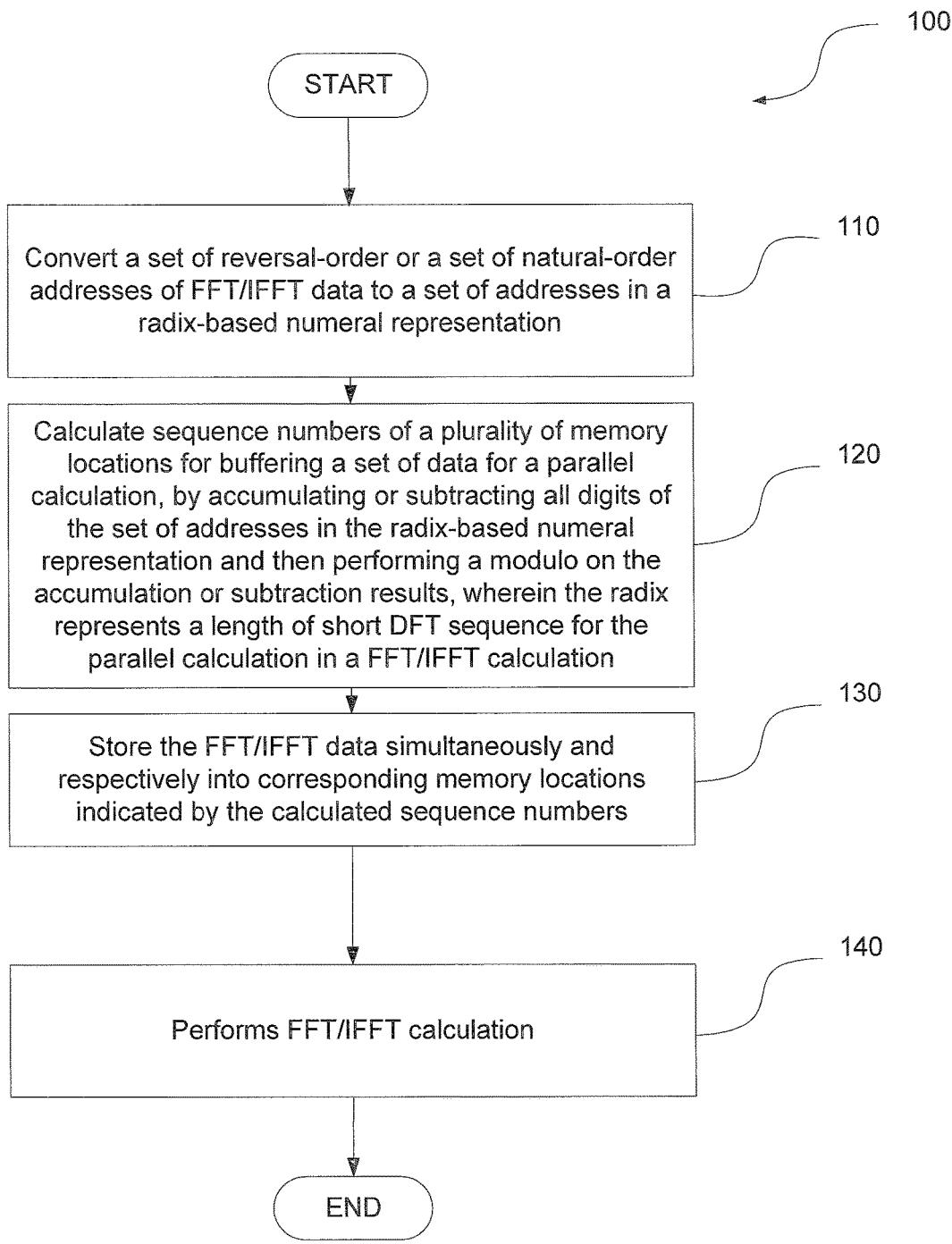
FIG. 1 is a flow chart illustrating a method according to an embodiment of the invention.

FIG. 1 is a flow chart illustrating a method 100 according to an embodiment of the invention. The method 100 in FIG. 1 comprises converting, in block 110, a set of reversal-order or a set of natural-order addresses of FFT/IFFT data to a set of addresses in a radix-based numeral representation.

Then the method 100 comprises in block 120, calculating sequence numbers of a plurality of memory locations for buffering a set of data for a parallel calculation, by accumulating or subtracting all digits of the set of addresses in the radix-based numeral representation and then performing a modulo on the accumulation or subtraction results, wherein the radix represents a length of short DFT sequence for the parallel calculation in a FFT/IFFT calculation. For example, if 8 points participate in a butterfly short DFT sequence calculation, then the radix is 8.

For example, suppose the address of the data is represented as Addr, which may be a natural order address, or a reverse order address, and a binary representation of the address is Addr=(1), wherein n=log 2(N), N is a FFT sequence length, and each digit $b_{n-1}, b_{n-2} \ldots b_0$ is a binary digit. If a r-radix algorithm is employed, and there are M blocks of memories, which are respectively represented as $m_0, \ldots m_{r-1}$. Data A are stored in a M-th memory according to mutual exclusion rule. By following the calculation method of modulo subtraction or modulo addition according to embodiments of the invention, M may be represented as $M=(b_{r-1}b_{r-2} \ldots b_0)_r+(b_{2r-1}b_{2r-2} \ldots b_r)_r+ \ldots +(b_{n-1}b_{n-2} \ldots b_{(l-1)r})_r$, or $M=(b_{r-1}b_{r-2} \ldots b_0)_r-(b_{2r-1}b_{2r-2} \ldots b_r)_r- \ldots -(b_{n-1}b_{n-2} \ldots b_{(i-1)r})_r$, l×log 2(R)=n, wherein r at the subscript of the parenthesis indicates that the data is a r-based number, and r represents the base for FFT.

For example, the address of the data may take another form:

Addr=$B_{s-1}B_{s-2}B_{s-3} \ldots B_1B_0$, wherein B is a r-based number. (2)

For example, for a 512-point (radix 8) FFT transform, the address of the data may be represented as $B_2, B_1, B_0$, wherein $B_2, B_1, B_0$ are all octal (8-based) numbers. Combined with equation (1), each digit B can be converted to binary numbers b, which can be represented as $B_2=b_{n-1}b_{n-2}b_{n-3}=b_8b_7b_6$, $B_1=b_{n-4}b_{n-5}b_{n-6}=b_5b_4b_3$, $B_0=b_2b_1b_0$.

The sequence numbers of the plurality of corresponding memory locations to which the data are to be stored can be represented as bank numbers (bank_num), that is, the sequence numbers of the plurality of memory locations for buffering a set of data used for parallel calculation, wherein bank_num=$(B_{s-1}+B_{s-2}+ \ldots +B_1+B_0)_r$,
wherein $B=b_{i-1}b_{i-1} \ldots b_1b_0$, i=log 2(r) (3)

The following table 1 shows how to obtain sequence numbers for the corresponding memories in a fully cyclic shift addresses scenario:

TABLE 1

| Address | sequence numbers for the corresponding memories in a fully cyclic shift addresses scenario |
|---|---|
| $B_2$, 0, $B_0$ | $B_2 + B_0 + 0$ |
| $B_2$, 1, $B_0$ | $B_2 + B_0 + 1$ |
| $B_2$, 2, $B_0$ | $B_2 + B_0 + 2$ |
| $B_2$, 3, $B_0$ | $B_2 + B_0 + 3$ |
| $B_2$, 4, $B_0$ | $B_2 + B_0 + 4$ |
| $B_2$, 5, $B_0$ | $B_2 + B_0 + 5$ |
| $B_2$, 6, $B_0$ | $B_2 + B_0 + 6$ |
| $B_2$, 7, $B_0$ | $B_2 + B_0 + 7$ |

Then, the FFT/IFFT data are stored substantially simultaneously and respectively into corresponding memory locations indicated by the calculated sequence numbers.

In a FFT butterfly calculation, a plurality of stages of FFT calculations may be needed. Suppose in any butterfly calculation in a stage S, the needed data address is represented as $A_r$.

Suppose i=log 2(r), r is the radix for FFT calculation. $A_r=b_{n-1}b_{n-2} \ldots b_{is}q_{i-1}q_{i-2} \ldots q_0b_{i(s-1)-1} \ldots b_0$, wherein $q_{i-1}q_{i-2} \ldots q_0=v$, v=0, 1, 2, 3 ..., r-1. bi, qi in the equation are both binary numbers, and v is a r-based number.

Therefore the sequence number for the memory to store the needed data is $$M_r=(b_{R-1}b_{R-2} \ldots b_0)+/- \ldots +/-v+/- \ldots (b_{n-1}b_{n-2} \ldots b_{(l-1)R}) \quad (4),$$

and the common item in the above equation is: Mconst= $(b_{R-1}b_{R-2} \ldots b_0)+/- \ldots +/-(b_{n-1}b_{n-2} \ldots b_{(l-1)R})$ (l≠s), wherein 1×log 2(r)=n. Wherein Mconst represents other common digits that participate in the same calculation. r represents the length of short DFT sequence calculator, for example 8 points, 16 points. R=log 2(r), and R represents the binary logarithm of r (which uses base 2).

$M_r$=Mconst+/-v, wherein v=0, 1, 2, 3 ..., r-1. Therefore the needed data are located in different memories, since r is distinctive.

The changed calculation method still has a mutually exclusive feature. When r changes continuously. $M_r$ also changes continuously, which causes the data obtained subsequently according $M_r$ have the same order as the data participating in the calculation, with only different initial point, which presents the nature of cyclic shift. Embodiments of the present invention make use of this nature of DFT and deduce a mathematical method and implementation architecture that may eliminate any reorder modules.

For example, in an example of 8 point FFT in the third stage of a r8-32k FFT, addresses of data that participate in the calculation are A0, A1 ... A7, and Mc is a sequence number of the memory based on embodiments of the present invention:

A0=000_001_000_100_000
Mc=000+001+000+100+000=$(101)_2$
A1=000_001_001_100_000
Mc=000+001+001+100+000=$(110)_2$
A2=000_001_010_100_000
Mc=000+001+010+100+000=$(111)_2$
A3=000_001_011_100_000
Mc=000+001+011+100+000=$(000)_2$
A4=000_001_100_100_000
Mc=000+001+100+100+000=$(001)_2$
A5=000_001_101_100_000
Mc=000+001+101+100+000=$(010)_2$
A6=000_001_110_100_000
Mc=000+001+110+100+000=$(011)_2$
A7=000_001_111_100_000
Mc=000+001+111+100+000=$(100)_2$

Although the above embodiment uses accumulative addition, embodiments of the invention also work for accumulative subtraction.

Table 2 represents data addresses represented using sequence number of the memories

TABLE 2

| Input data address | sequence number of the memories | Corresponding data addresses received by Mc according to embodiments of the invention |
|---|---|---|
| A0 | 000 | A3 |
| A1 | 001 | A4 |
| A2 | 010 | A5 |
| A3 | 011 | A6 |
| A4 | 100 | A7 |
| A5 | 101 | A0 |
| A6 | 110 | A1 |
| A7 | 111 | A2 |

From Table 2, it can be seen that data addresses according to embodiments of the invention possess the nature of cyclic shift.

The following derivation process shows that the mathematical equivalence of embodiments of the invention.

Basic equation for DFT $$X[k]=\Sigma_0^{N-1} x[n] \cdot W_N^{nk} \quad (5)$$

basic natures of DFT are $$x[(n-m)_N] \rightarrow X[k] \cdot W_N^{km} \quad (6)$$

$$x[n] \cdot W_N^{-ln} \rightarrow X[(k-l)_N] \quad (7)$$

Suppose l=m in equations (2) and (3), then the follow equation can be obtained $$X[(k-s)_N] = \sum_0^{N-1} x[(n-s)_N] \cdot W_N^{(n-s)(k-s)} \quad (8)$$

$$= \sum_0^{N-1} x[(n-s)_N] \cdot W_N^{-sn} \cdot W_N^{nk} \cdot W_N^{-sk} \cdot W_N^{s^2}$$

Equation (8) shows that after certain mathematical transformations. DFT results of X [n], which is a shifted sequence X[k−s] shifted from X [k], can be obtained by performing a standard DFT operation on X[n−s] which is cyclicly shifted from X[n].

The correct results can be obtained even without a reordering module, according to the address arrangements of the embodiments.

Then in block 130, the method stores the FFT/IFFT data simultaneously and respectively into corresponding memory locations indicated by the calculated sequence numbers.

Then, in block 140, the method performs FFT/IFFT calculation.

To be specific, in block 140, the method 100 retrieves corresponding data from the memory, inputs directly the corresponding data into a short DFT sequence calculator for calculation, modifies the calculated data with a modified twiddle factor, in-place stores the modified data back to the memory directly; repeats the short DFT sequence calculation, until the whole FFT/IFFT calculation completes. Note the whole FFT/IFFT calculation completes means all the stages of calculations are completed.

The embodiments of the present invention change data address arrangement. Embodiments use modulo addition or modulo subtraction so that the data arrangement order features a cyclic shift of the needed data order while maintaining mutual exclusivity of data access, instead of random order of data access without any rule. In other words, the calculated sequence numbers of the memory locations are cyclic shifts of the sequence numbers of the data used in a short DFT sequence calculation. Mathematically the method 100 uses the time shift and frequency shift nature of DFT, and enables the data to directly enter the calculator without being rearranged. Further, the output data of the calculator does not need to be rearranged to complete the whole FFT calculation. The in-place calculation is performed, therefore there is no need to add additional memories. In other words, for each calculation, data are retrieved from the memories with corresponding sequence number according to the sequence number through ports of the short DFT sequences calculation. Data do not need to be ordered but instead can be directly fed to the above mentioned short DFT sequence calculator port. Then, according to the sequence number of output port of the calculators, the calculation results enter the memories with corresponding sequence number according to sequence numbers of output ports of short DFT sequences calculator, therefore in-place calculation is realized.

Alternatively, in another embodiment, the FFT results need modification for implementing the in-place calculation, which further reduces overhead.

Figure 2:
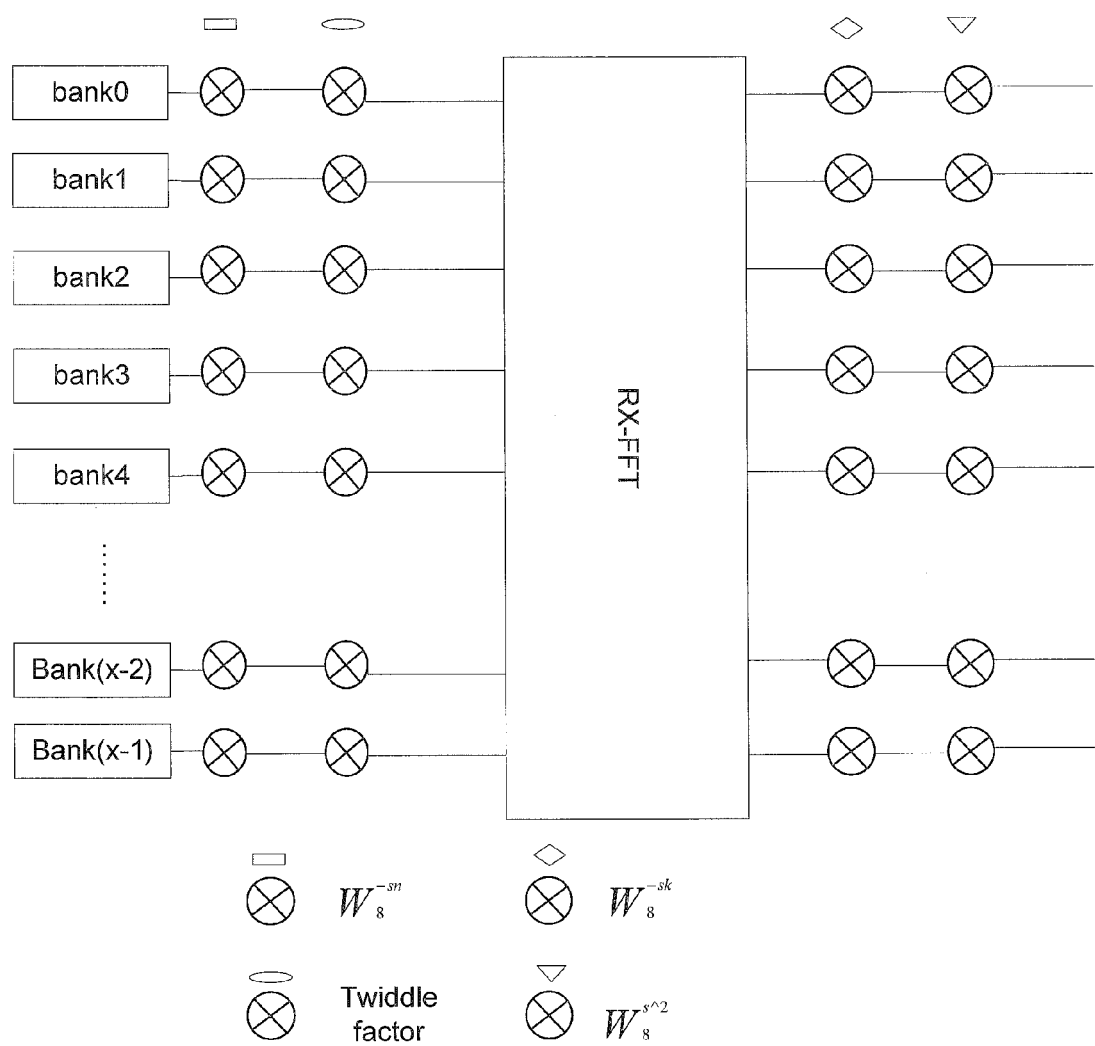
FIG. 2 is a diagram illustrating a FFT computation circuit including multipliers for modification.

For example, FIG. 2 shows a diagram illustrating a FFT computation circuit including multipliers for modification. Wherein a column of multipliers marked by a rectangular pattern represents $W_8^{-sn}$, which correspond to $W_N^{-sn}$ in the above Equation (8). A column of multipliers marked by an oval pattern represents the twiddle factors, which correspond to $W_N^{-nk}$ in the above Equation (8). A column of multipliers marked by a diamond pattern represents $W_8^{-sk}$, which correspond to $W_N^{-sk}$ in the above Equation (8). A column of multipliers marked by a triangle pattern represents $W_8^{s^2}$, which correspond to $W_N^{s^2}$ in the above Equation (8).

To be specific, $W_N^{-sn}$ represents a first modifying factor, $$W_N^{-sn}=W(-sn',r)=\exp(j\times(C\times n)_r\times 2\mathrm{pi}/r), n= 0,1,2 \ldots r-1 \quad (11)$$

The Twiddle factor can be represented as $$W_{twiddle}=\exp(-j\times(B_i\times(B_{i-1}B_{i-2} \ldots B_1B_0)\times r^{\hat{}}(s-i))\times 2\mathrm{pi}/N) \quad (9)$$

The second modifying factor can be represented as $W_N^{-sk}\times W_N^{s^2}$,

Wherein $$W_N^{-sk}=W(-sk,r)=\exp(j\times(B\times k)_r\times 2\mathrm{pi}/r), k= 0,1,2 \ldots r-1 \quad (10)$$

$$W_N^{s^2}=W(s2,r)=\exp(-j\times(B\times B)_r\times 2\mathrm{pi}/r) \quad (12)$$

Therefore, $W_N^{-sk}\times W_N^{s^2}=\exp[(j\times(B\times k)_r\times 2\mathrm{pi}/r)+(-j\times(B\times B)_r\times 2\mathrm{pi}/r)]$ As shown in FIG. 2, data to be treated with short DFT sequences calculation are first adjusted by a first modifying factor, then the revised sequence are treated with the twiddle factor, and then the treated sequence are input into short DFT sequence calculator for calculation, finally the second modifying factor is used to adjust the data after DFT calculation. Wherein, $B=(\Sigma B_s)_r$, ($s \neq i-1$). i represents a stage of FFT/IFFT calculation. The data have an address of $B_{s-1}B_{s-2}B_i \ldots B_1B_0$, $B_1=0, 1, 2 \ldots r-1$, r represents a radix of FFT calculation, each of $B_{s-1}$, $B_{s-2}$, $B_1$, $B_0$ is a radix-based digit, and N represents a number of points of FFT/IFFT calculation.

Figure 3:
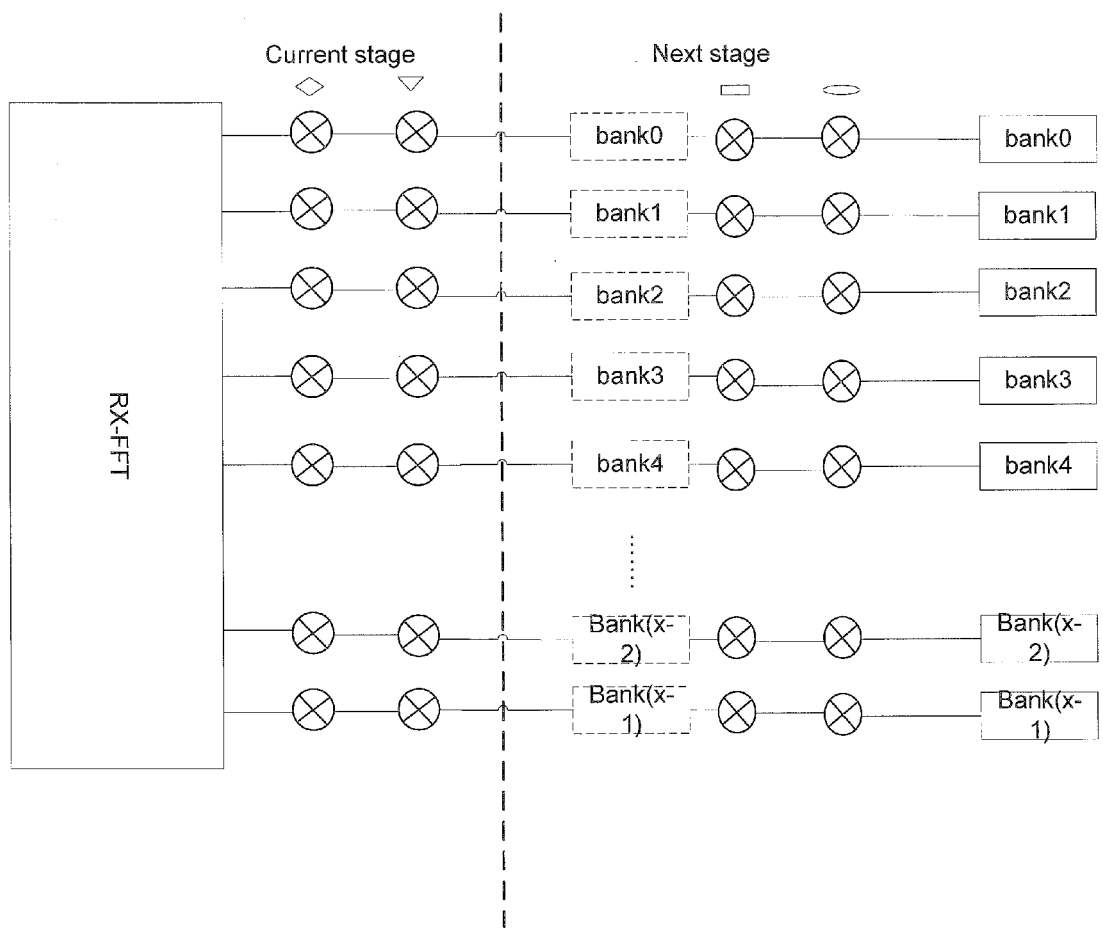
FIG. 3 is a diagram illustrating another FFT computation circuit including an alternative for the multipliers shown in FIG. 2.

FIG. 3 is a diagram illustrating another FFT computation circuit including an alternative for the plurality of multipliers shown in FIG. 2. In order to further optimize the structure of the circuit, in the embodiments of the invention, the locations of the memories for storing data are adjusted. That is, the original memory banks which are marked as dotted boxes are moved to the locations illustrated as solid boxes. In addition, the last two modifying factors (which are the multiplier $W_8^{-sk}$ marked by the diamond pattern and the multiplier $W_8^{s^2+s}$ marked by triangular pattern) in a current stage are combined with the first two factors in a next stage (which are the multiplier $W_8^{-sn}$ marked by the rectangle pattern and the multiplier marked by oval pattern).

Comparing FIG. 2 and FIG. 3, it can be obtained that FIG. 3 moves the location of the memories, and combines factors of two stages together. Because memory only temporarily stores data, and does not participate in the calculation, the change of location of the memories will not affect the calculation results. Due to special properties of the twiddle factor (also known as a phase factor), the multiplication of the four rotating factors is the addition of their respective phases. Therefore, by modifying the location of look-up table of the original twiddle factor, the multiplication of the four factors can be obtained, which substantially simplifies the circuit structure, and may improve the advantage of embodiments of the invention. Due to that the twiddle factor of the first stage always equals a constant of 1, the first stage only needs to add a simple data input transformation. The final circuit architecture diagram is shown in FIG.

Figure 4:
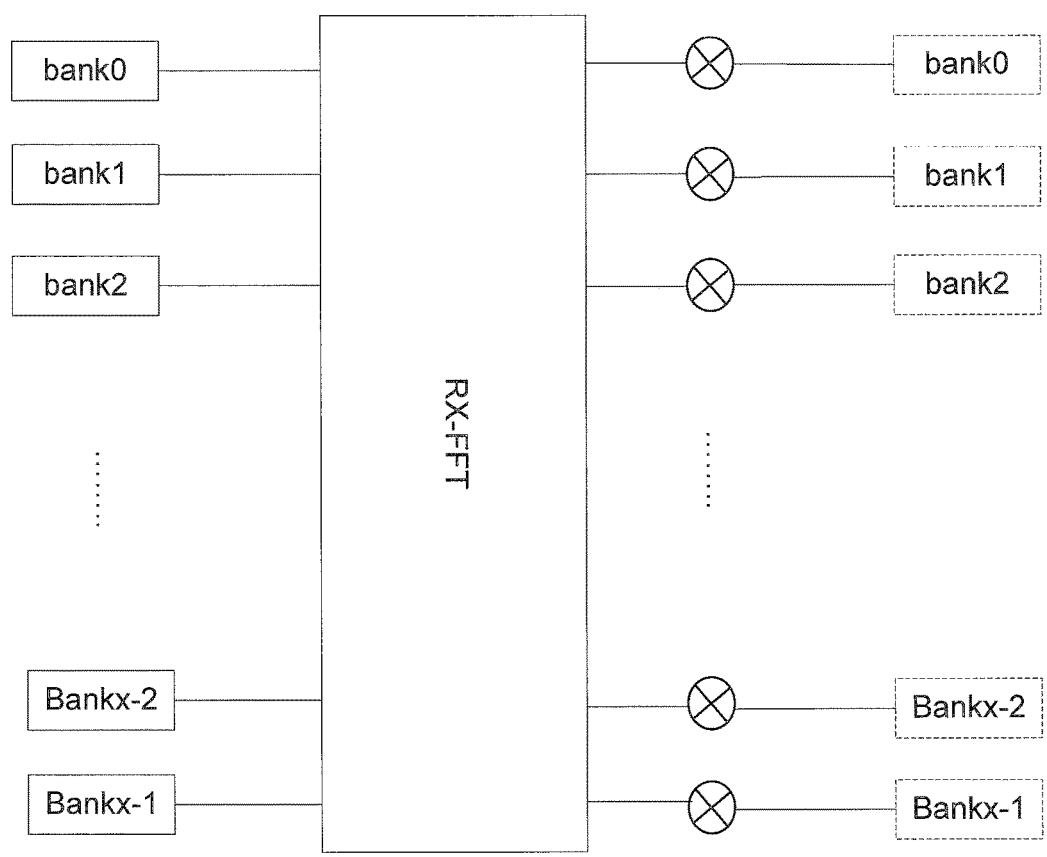
FIG. 4 is a diagram illustrating another FFT computation circuit including a combination for the multipliers shown in FIG. 3.

FIG. 4 is a diagram illustrating another FFT computation circuit including a combination for the multipliers shown in FIG. 3. In FIG. 4, the four multipliers shown in FIG. 3 are merged into one multiplier, which conserves the component resources in the circuit. Although FIG. 4 shows two sets of memory banks, the two sets of memory banks are of one group and can be reused.

In order to calculating stage 1, the address of the data is represented as $B_{s-1}B_{s-2}B_i \ldots B_1B_0$, wherein $B_i=0, 1, 2 \ldots r-1$ Suppose $$B=(\Sigma B_s)_r, (s \neq i-1),$$

$$C=(\Sigma B_s)_r, (s \neq i),$$

and $$W_{twiddle}=\exp(-j \times (B_{i+1} \times (B_iB_{i-1} \ldots B_1B_0) \times r^{\hat{}}(s-i) \times 2pi/N) \quad (9);$$

$$W(-sk,r)=\exp(j \times (B \times k)_r \times 2pi/r), k=0,1,2 \ldots r-1 \quad (10)$$

$$W(-sn',r)=\exp(j \times (C \times n)_r \times 2pi/r), n=0,1,2 \ldots r-1 \quad (11)$$

$$W(s2,r)=\exp(-j \times (B \times B)_r \times 2pi/r) \quad (12)$$

The following modification is carried out:

$$W\text{total} = W\text{twiddle} \times W(-sk,r) \times W(-sn',r) \times W(s^2,r) \quad (13)$$

Then all these factors are combined, and normalized with radix N:

$$\text{Index} = B_{i+1} \times (B_iB_{i-1} \ldots B_1B_0) \times r^{\hat{}}(s-i) + [(B \times k)_r + (C \times n)_r + (B \times B)_r] \times (N/r) \quad (14)$$

Therefore, $$W=\exp[(-j \times (B_{i+1} \times (B_iB_{i-1} \ldots B_1B_0) \times r^{\hat{}}(s-i)) \times 2pi/N) + (j \times (B \times k)_r \times 2pi/r) + (j \times (C \times n)_r \times 2pi/r) + (-j \times (B \times B)_r \times 2pi/r)] \quad (15)$$

In the above equations, the subscript r in $(B \times k)_r$ represents modulo by r. For example, $B=3$, $k=4$, $r=8$, and $B \times k=12$, the result of $B \times k \mod r$ equals 4. Other similar subscripts have similar meanings.

In other words, in an embodiment, as shown in FIG. 4, the data after IFFT/FFT calculation are adjusted by a twiddle factor, that is, the calculation results of FFT and IFFT calculation unit are multiplied by the twiddle factor, which is expressed as $\exp[(-j \times (B_{i+1} \times (B_iB_{i-1} \ldots B_1B_0) \times r^{\hat{}}(s-i)) \times 2pi/N) + (j \times (B \times k)_r \times 2pi/r) + (j \times (C \times n)_r \times 2pi/r) + (-j \times (B \times B)_r \times 2pi/r)]$, wherein $B=(\Sigma B_s)_r$, $(s \neq i-1)$, $C=(\Sigma B_s)_r$, $(s \neq i)$, i represents a stage of FFT/IFFT calculation, the data have an address of $B_{s-1}B_{s-2}B_i \ldots B_1B_0$, and $Bi=0, 1, 2 \ldots r-1$, r represents the radix of FFT calculation, each of $B_{s-1}$, $B_{s-2}$, $B_1$, $B_0$ is a radix-based digit, and N represents the number of points of FFT/IFFT calculation.

For the first stage, since some factors in the above formula (15) equal 1, that is, $W_{twiddle}=1$, therefore, for the first stage, the modifying factor can be further simplified as:

$$W=W_N^{-sn}=\exp(j \times (C \times n)_r \times 2pi/r), n=B_0, C=(\Sigma B_s), (s \neq 0) \quad (16)$$

Before data is first written into memory, the data are modified according to equation (16). Note, the multiplier shown in FIG. 4 is a combination of two multipliers in the current stage and two multipliers in the next stage shown in FIG. 3.

The modification of the twiddle factor is carried out according to the requirements of the formula (8) by modifying the index location in the look-up table. Only a R-bit adder is needed to add on the addresses of the original solution, and the modification values are controlled by a controller. Note the twiddle factor corresponds to formula $2\pi/r$. Therefore, an addition by looking up the table is introduced to the higher R bits of the twiddle factor, and a corrected index is obtained. The modified twiddle factor is obtained by using the value in the modified index. Also note that, in actual operation, the multiplication of multipliers is converted to a phase addition. It is the addition operation that is actually performed, and a modified value can be obtained by searching through the look-up table.

In at least one embodiment of the present invention, when a set of data include data calculated for a stage other than the first stage, the method 100 further includes retrieving data from a corresponding memory location. The basic circuit architecture adopts the architecture shown in FIG. 4. Data addresses are generated by the controller in each stage of iterations, and the data are retrieved from each bank, and directly inputted into the short DFT sequence calculator. The calculated data are then multiplied by a modified twiddle factor, and then are saved back to the banks, and ready for the next stage calculation.

Specifically, in each stage of FFT calculation, including the first stage, the times for performing r-point FFT calculation are N/r. N represents the number of overall points in FFT computation, and r is the radix of FFT computation. In each stage of the calculation, only a small portion of the r-point data may have correct order. In the embodiment of the invention, r points of data output from the memory are cyclic shifts of input points.

In an embodiment of the present invention, the FFT/IFFT calculation has a length of an integer power of 2. When the points of FFT computation, that is, the length of data is not an integer power of the radix r, the addresses of the data can be filled with 0, so that the filled addresses are integer powers of the radix r. For example, For a 128-point FFT, when a 8-point DFT is used, $R=\log 2 (8)=3$, $I=\log 2(128)=7$.

In an embodiment, if I=7, the address can be filled with two zeros (0). In particular, FFT has two forms. One is a decimation-in-time FFT (DIT-FFT), is a kind of decimation-in-frequency FFT (DIF-FFT).

Assume that a sequence of data carries on DIT-FFT and they have nature_address=$a_{s-1}a_{s-2}a_{s-3} \ldots a_4a_3a_2a_1a_0$ For the first step the data need to be rearranged with a "reverse address". Further, how to reverse the address depends on current stage of DIT-FFT.

For example, assume a R-radix DFT is used. Let R=log 2(r).

Case 1: s is just the integral multiple of R.

There are m stages in total, where m=s/R, and every stage takes r-point DFT. We convert the nature address to r-base system like below, nature_address=$r_{m-1}r_{m-2} \ldots r_1r_0$ reverse_address=$r_0r_1 \ldots r_{m-2}r_{m-1}$ The above equation (2) gives addr=$B_{s-1}B_{s-2}B_{s-3} \ldots B_1B_0$, B is a r-radix number in reverse address. How to get reverse address is omitted since embodiments of the invention do not care about the process.

Case 2: s is not the integral multiple of R.

There are still m stages, where m=⌈s/R⌉, ⌈ ⌉ means round up operation. There is a stage taking rs-radix DFT and others taking r-radix DFT. rs is still an integral power of 2, but is less than r. It is ok to put the rs-radix DFT in any stage in theory. It decides how to reverse address.

For example, assume the rs-radix is put in stage m-i. Nature address is converted to a r-rs-mixed system, nature_address=$r_{m-1}r_{m-2} \ldots rs_i \ldots r_1r_0$ r is a r-radix number, and rs is a rs-radix number.

reverse_address=$r_0r_1 \ldots rs_i \ldots r_{m-2}r_{m-1}$

For example, a 256-point FFT with 8-radix DFT is performed. s=log 2(N)=8, R=log 2(r)=3, m=⌈s/R⌉=⌈8/3⌉=3. rs=4. Therefore there are 3 stages which comprise two stages of 8-radix DFT and one stage of 4-radix DFT.

nature address=$b_7b_6b_5b_4b_3b_2b_1b_0$, wherein b is binary number subcase 1: 4-radix DFT is performed first nature_address=$rs_2r_1r_0$, $r_0=b_2b_1b_0$, $r_1=b_5b_4b_3$, $rs_2=b_7b_6$ reverse_address=$r_0r_1rs_2$ In an embodiment, rs2 is modified by adding zeros. Now define rs'={rs, '0'}, the memory location number can be figured out by adding $r_0$, $r_1$, $rs_2'$.

Let $B_{s-1}B_{s-2}B_{s-3} \ldots B_1B_0=r_0 r_1 \ldots r_{m-2} r_{m-1}$, which ca refer to the above equation (2). The following calculations can be performed with reference to equation (2).

Sub case 2: The 4-radix DFT is performed at medial stage.

nature_address=$r_2rs_1r_0$ $r_0=b_2b_1b_0$ $r_2=b_7b_6b_5$ $rs_1=b_4b_3$ reverse_address=$r_0rs_1r_2$ In an embodiment, define rs'={rs, '0'}, and the memory location number=$r_0+rs_1'+r_2$ Sub case 3: 4-radix DFT is performed at the last stage nature_address=$r_2r_1rs_0$ $r_1=b_4b_3b_2$ $r_2=b_7b_6b_5$ $rs_0=b_1b_0$ reverse_address=$rs_0r_1r_2$ In an embodiment, define rs'={rs, '0'}, and the memory location number=+$rs_0'+r_2$ Although the above embodiments use DIT-FFT as examples, embodiments of the invention also apply to DIF-FFT.

For example, in an embodiment, assume that a sequence of data carries on DIF-FFT and they have nature_address=$a_{s-1}a_{s-2}a_{s-3} \ldots a_4a_3a_2a_1a_0$ convert nature address to r-base system nature_address=$r_{m-1}r_{m-2} \ldots rs_i \ldots r_1r_0$ It doesn't need to reverse the address, and the other operation is the same as DIT-FFT. The memory location number is calculated by adding all r and rs'.

The following embodiments describe how to perform rotation after filling the address with zero (0)s.

For a DIT-FFT, define $st_i$ as a stage for calculating DFT operation, $st_{i-1}$ is the previous stage and $st_{i+1}$ means the next stage.

Previous stage:

index=$-[(C_0 \times n)_r] \times (N'/r)$

1~m-1 stages:

index=$B_{i+1} \times (B_iB_{i-1} \ldots B_1B_0) \times r^{\hat{}}(m-i) - [(D_{i-1} \times k_{i-1})_{ri-1} + (D_{i-1} \times D_{i-1})_{ri-1}] \times (N'/ri) + (C_i \times n_{i-1})_{ri} \times (N'/r_i)$ (In the following description, B is replaced with D to avoid confusion.)

m stage:

index=$[(D_{m-1} \times k)_r + (D_{m-1} \times D_{m-1})_r] \times (N'/r)$ $C_i=(\Sigma B_s)_r$, (s≠i), if stage i is not a r-radix stage, $C_i=(\Sigma B_s)_r >> [\log 2(r) - \log 2(rs)]$, (s≠i). >> represents shift to the right. $C_i$ equals the calculation results for $(\Sigma B_s)_r$ divided by [log 2(r)−log 2(rs)].

$D_i=(\Sigma B_s)_r$, (s≠i), if stage i is not a r-radix stage, $D_i=(\Sigma B_s)_r >> [\log 2(r) - \log 2(rs)]$, (s≠i)

k=n=$(\Sigma B_s)_r$, if stage i is not a r-radix stage, k=n=$(\Sigma B_s)_r >> [\log 2(r) - \log 2(rs)]$ N'=$r^m$, $r_i$=rs or r.

in another embodiment, for a DIF-FFT, $st_i$ is defined as a stage for calculating DFT operation, $st_{i-1}$ is the previous stage and $st_{i+1}$ means the next stage.

Previous stage:

index=$-[(C_0 \times n)_{ri}] \times (N'/r)$

1~m-1 stage:

index=$B_{m-i} \times ((B_{m-i-1} \ldots B_1B_0) \times r^{\hat{}}(i-1) - [(D_{m-1} \times k_{m-i})_{ri-1} + (D_{m-i} \times D_{m-i})] \times (N'/r_{m-i}) + (C_{m-i-1} \times n_{m-i-1})_{rm-i-1} \times (N'/r_{m-i})$ m stage index=$[(D_0 \times k)_{r0} + (D_0 \times D_0)_{r0}] \times (N'/r_0)$ The address filling method in the above embodiments also applies to filling an address with one zero, or more than two zeros.

In another embodiment, before calculating the data address, i.e, the address of the data which can be expressed as addr=$B_{s-1}B_{s-2}B_{s-3} \ldots B_1B_0$, wherein B is r-radix digit, B is further transformed. Assume $B'=B+(b_0)\times(r/2)$, and another expression is $B'=(b_{i-1}\wedge b_0) b_{i-2} \ldots b_1 b_0$. $\wedge$ represents XOR operation.

Suppose the data have an address of $(476)_8$, $B_2=(4)_8=(100)_2, B_2'=(100)_2+0\times(8/2)=4;$ $B_1=(7)_8=(111)_2, B_1'=(111)_2+1\times(8/2)=3;$ $B_0=(6)_8=(110)_2, B_0'=(110)_2+0\times(8/2)=6.$ The sequence number of memory can be represented as:

bank_num=$(4+3+6)_8=7$

According to the other expression, the same result is obtained:

For example, the data have an address of $(476)_8$, $B_2=(4)_8=(100)_2, B_2'=((1\oplus 0)00)_2=(100)_2=4;$ $B_1=(7)_8=(111)_2, B_1'=((1\oplus 1)11)_2=(011)_2=3;$ $B_0=(6)_8=(110)_2, B_0'=((1\oplus 0)10)_2=(110)_2=6.$ The sequence number of memory can be represented as:

bank_num=$(4+3+6)_8=7$

The following table 3 shows how to obtain sequence numbers for the corresponding memories in a partial cyclic shift addresses scenario:

TABLE 3

| Address | sequence numbers for the corresponding memories in a partial cyclic shift addresses scenario |
|---|---|
| $B_2$, 0, $B_0$ | $B_2' + B_0' + 0$ |
| $B_2$, 1, $B_0$ | $B_2' + B_0' + 5$ |
| $B_2$, 2, $B_0$ | $B_2' + B_0' + 2$ |
| $B_2$, 3, $B_0$ | $B_2' + B_0' + 7$ |
| $B_2$, 4, $B_0$ | $B_2' + B_0' + 4$ |
| $B_2$, 5, $B_0$ | $B_2' + B_0' + 1$ |
| $B_2$, 6, $B_0$ | $B_2' + B_0' + 6$ |
| $B_2$, 7, $B_0$ | $B_2' + B_0' + 3$ |

In the above embodiment, the even digits 0, 2, 4, 6 still have cyclic shift features, while the odd digits are out of order. A reordering unit is needed to swap 5 and 1, and swap 7 and 3. Therefore the reordered $B_1$ has the sequence of 0, 1, 2, 3, 4, 5, 6, 7.

Figure 5:
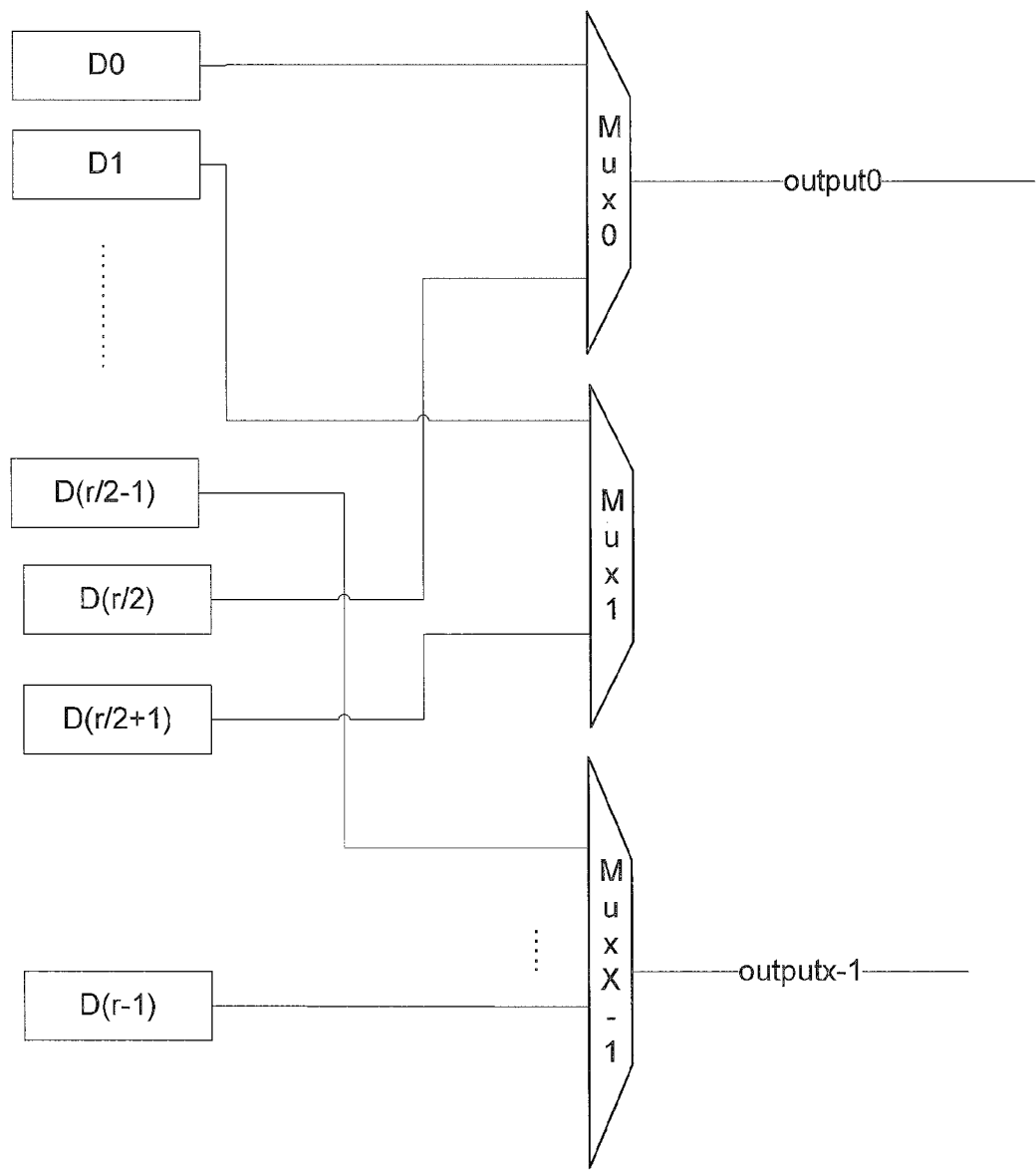
FIG. 5 is a diagram illustrating a multiplexer according to an embodiment of the invention.

Partial cyclic shift is an auxiliary method. In this method, there is no need to reorder data to a complete correct order. Reorder the data to a cyclic shift order is ok, then the methods in the above discussed embodiments may be used. In order to reorder to a cyclic shift order, a number of r/2 2-to-1 multiplexers (MUX, also known as the logic gate circuit) are needed. In other words, in partial cyclic shift situation, for the corresponding sequence number of the memories, a MUX is needed to reorder a set of data from the corresponding memory locations, wherein a number of selectable paths of the selector are smaller than the radix of the FFT/IFFT calculation. By contrast, in a conventional method, a number r of r-to-1 multiplexers (MUX) are needed. Therefore, the embodiment still greatly reduces the wiring, thereby saving the on-chip area. How to deploy r/2 number of 2-to-1 multiplexers depends on which address configuration is used. For example, FIG. 5 shows multiplexers according to an embodiment of the present invention. If $B'=(b_{i-1}\wedge b_0) b_{i-2} \ldots b_1 b_0$, as shown in FIG. 5, the multiplexers are put between each pair of the followings $(D_0, D_{r/2}), (D_1, D_{r/2+1}), (D_2, D_{r/2+2}) \ldots (D_{r/2-1}, D_{r-1})$.

According to other embodiments of the present invention, although rearrangement orders of the data and the corresponding gating logic circuit for rearranging data orders are still needed, the used gating logic circuit is far less than the number needed for a total random order.

Although the above embodiments use FFT calculations as examples, the above embodiments also apply to Inverse Fast Fourier inverse transformation (IFFT). In general, FFT and IFFT have conjugate relations between each other. Namely, the IFFT and FFT calculation results have same real part, and inverse imaginary part. Therefore, if the block diagram shown in FIG. 4 is used for IFFT calculation, for example, before the data are fed into memories, first the imaginary part of the data are inversed (or opposite, or sign change, or negation). After the calculation results are retrieved from the memory, the imaginary parts of the calculation results are inversed again, so as to get IFFT calculation results.

In other embodiments, the data arrangement methods are not limited to modulo addition or modulo subtraction. Any methods that can generate full cyclic shift arrangements, or partial data have the nature of the cyclic shift, may be applied.

In another embodiment, the nature of partial cyclic shift can be used to simplify the reorder module. However, the module cannot be completely removed.

In another embodiment, by using a plurality of complex multipliers, the calculations can be directly performed without combining the modifying factors.

Further, in another embodiment, by changing the positions of the memories that store the data in the iteration process, extra complex multipliers may be combined with the original twiddle factor multiplier. Therefore the embodiment does not increase any multiplication resources, but only increase several n-bit adder (n is for the radix of butterfly calculation), and the additional adders are not in the data path.

Further, although embodiments of the invention use the butterfly calculation as an example, the embodiments of the invention also apply to other short DFT sequence calculations, for example, Cooley-Tukey algorithm, Rader's algorithm, Bluestein's algorithm, etc.

Figure 6:
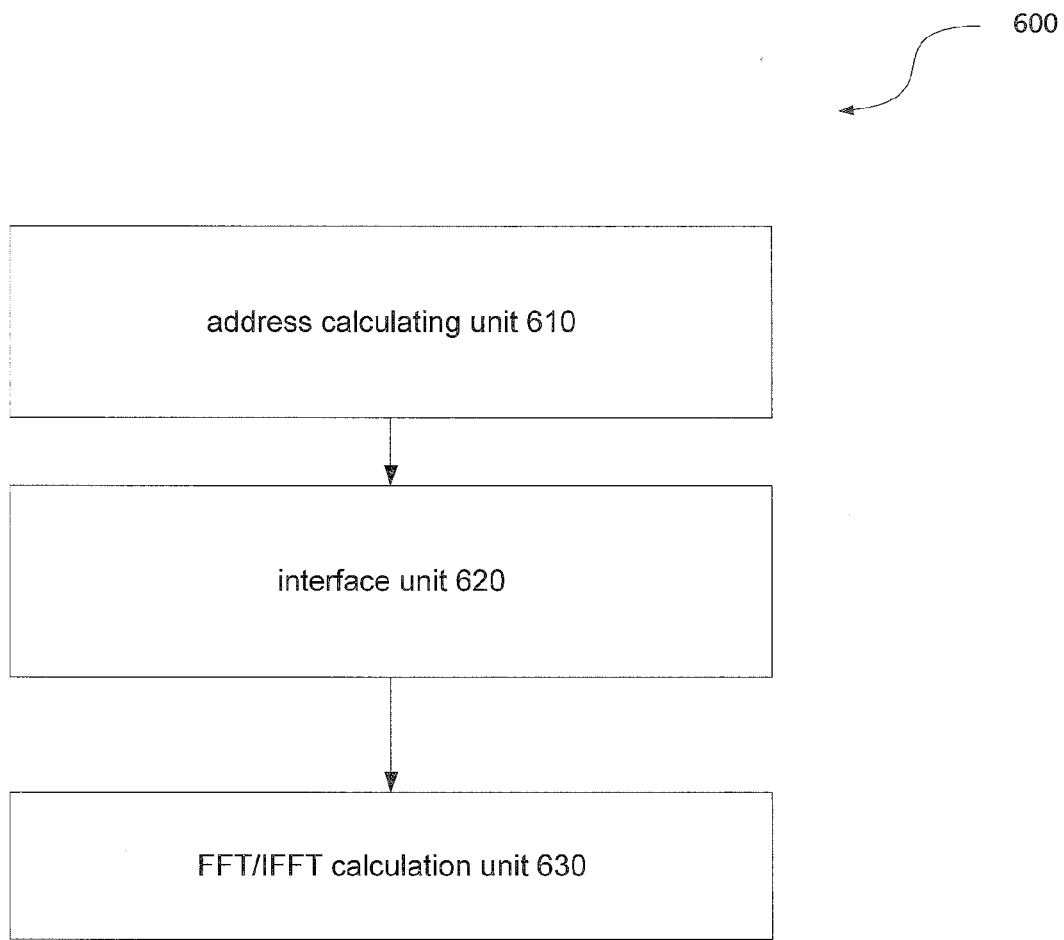
FIG. 6 is a block diagram illustrating a circuit according to an embodiment of the invention.

FIG. 6 is a block diagram illustrating a circuit 60 according to an embodiment of the invention. A circuit 600 for performing Fast Fourier Transform/Inverse Fast Fourier Transform (FFT/IFFT) comprises an address calculating unit 610, an interface unit 620 and a FFT/IFFT calculation unit 630.

The address calculating unit 610 is configured to convert a set of reversal-order or a set of natural-order addresses of FFT/IFFT data to a set of addresses in a radix-based numeral representation. The address calculating unit 610 is further configured to calculate sequence numbers of a plurality of memory locations for buffering a set of data for a parallel calculation, by accumulating or subtracting each digit of the set of addresses in a radix-based numeral representation and then preforming a modulo operation on the accumulation or subtraction results. Wherein the radix represents a length of short DFT sequence for the parallel calculation in a FFT/IFFT calculation.

The interface unit 620 is configured to store the FFT/IFFT data simultaneously and respectively into corresponding memory locations indicated by the calculated sequence numbers.

The FFT/IFFT calculation unit 630 is configured to perform a FFT/IFFT calculation. The FFT/IFFT calculation unit 630 further comprises a short DFT sequence calculator (not shown in figured), configured to retrieve corresponding data from the memory, directly perform a short DFT sequence calculation for the data, modify the calculated data with a modified twiddle factor, in-place store the modified data back to the memory directly. The short DFT sequence calculator repeats the short DFT sequence calculation, until the whole FFT/IFFT calculation completes.

Alternatively, for each calculation, the interface unit is configured to, for each calculation, obtain data from a memory with a corresponding sequence number according to the sequence number, inputting the data into ports for short DFT sequence calculator without reordering the data, and output, calculation results from the calculator, to corresponding memories according to the sequence number of output ports.

Alternatively, the calculated sequence numbers of the plurality of memory locations are cyclical shifts of data sequence numbers used in the short DFT sequence calculation.

In another embodiment, the modified short DFT sequence calculation data do not need to be re-ordered, and the data can directly enter corresponding ports of FFT/IFFT calculation unit; and the circuit 600 does not include a multiplexer.

Figure 7:
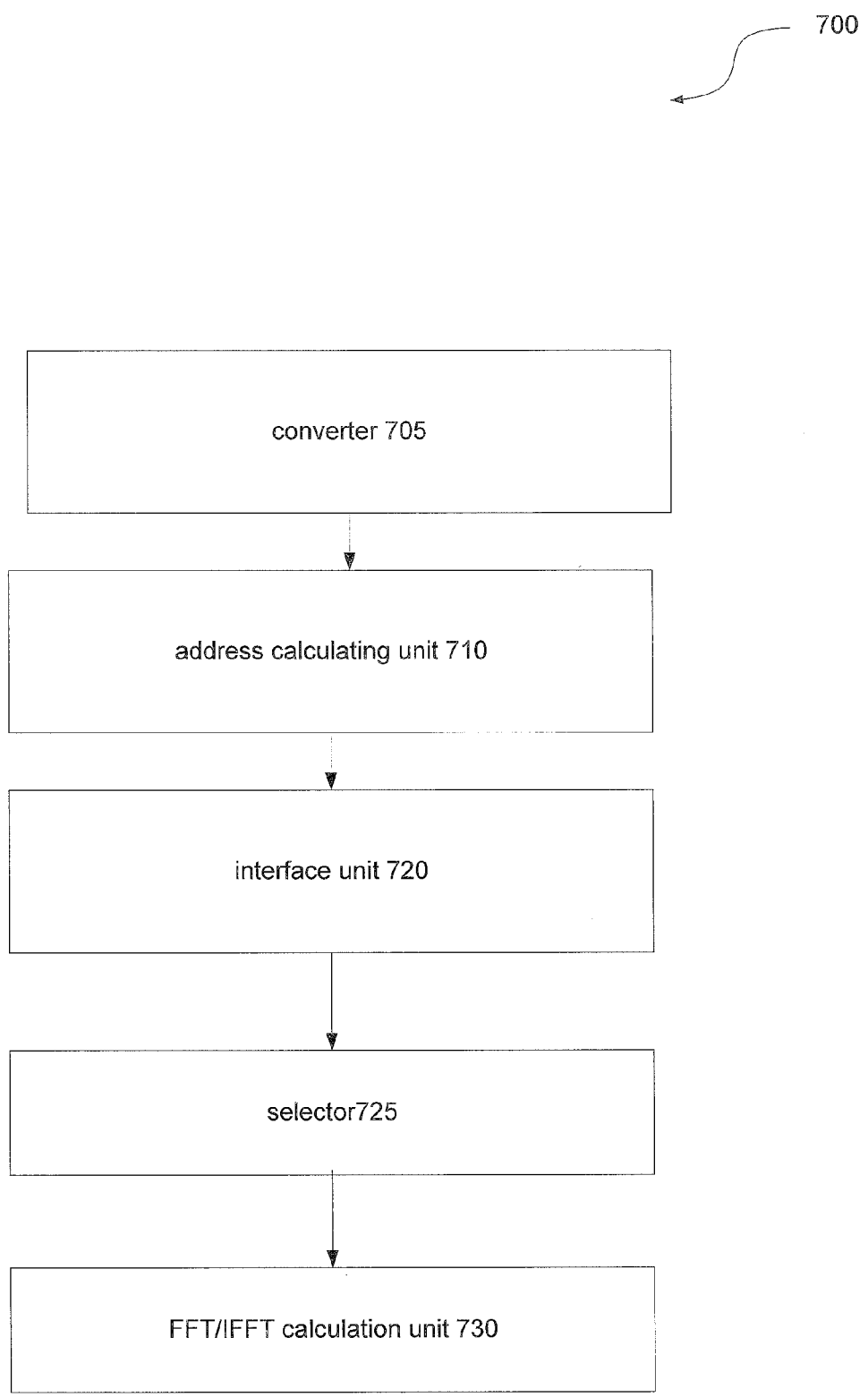
FIG. 7 is a block diagram illustrating a circuit according to another embodiment of the invention.

FIG. 7 is a block diagram illustrating a circuit 700 according to another embodiment of the invention. The data addresses are represented as a plurality of digits based on radix. Each digit comprises a plurality of bits. In addition to the address calculating unit 710, interface unit 720, and a FFT/IFFT calculation unit 730, the circuit 700 further comprises a converter 705 and a selector 730. The converter 705 is configured to convert each digit by performing XOR operation on two of the plurality of bits of each digit.

The address calculating unit 710 is further configured to calculate sequence numbers of a plurality of memory locations for buffering a set of data for a parallel calculation, by accumulating or subtracting all the converted digits of the set of addresses in a radix-based numeral representation of each data and then modulo the accumulation or subtraction results; wherein the calculated sequence numbers of the plurality of memory locations are a part of cyclical shifts of data sequence numbers used in one short DFT sequence calculation. The circuit further comprises a selector 725 configured to reorder the set of data from the corresponding memory locations. The circuit may include a number r of selectors, and the number of reselectable paths of each selector is smaller than r, which is the radix of the FFT/IFFT calculation. Then the FFT/IFFT calculation unit is further configured to perform the FFT/IFFT calculation on the set of reordered data.

In addition, the interface unit 720, FFT/IFFT calculation unit 730 in FIG. 6 respectively perform similar functions as the interface unit 620 and FFT/IFFT calculation unit 630 shown in FIG. 6, and their descriptions are omitted here.

Figure 8:
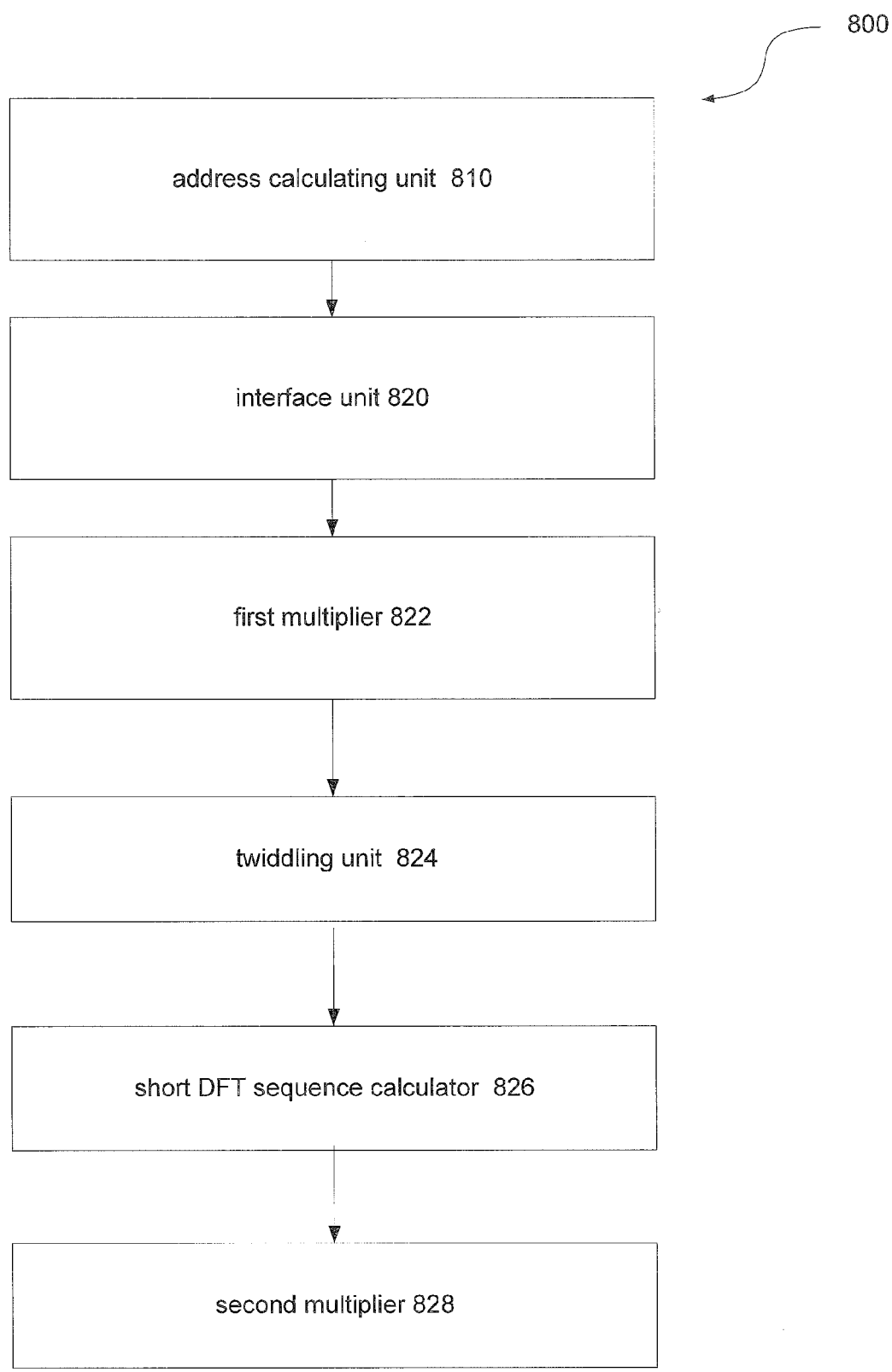
FIG. 8 is a block diagram illustrating a circuit according to another embodiment of the invention.

Alternatively, FIG. 8 is a block diagram illustrating a circuit 800 according to another embodiment of the invention. An address calculating unit 810 and an interface unit 820 in the circuit 800 are respectively similar to the address calculating unit 710 and the interface unit 720 shown in FIG. 7, therefore their descriptions are omitted. The circuit 800 further comprises a first multiplier 822, configured to modify the data to be treated with the short DFT sequence calculation with a first modifying factor, wherein the first modifying is represented as $\exp[(j \times (B \times n)_r \times 2pi/r)]$; a twiddling unit 824, configured to treat the modified sequence with a twiddle factor $\exp[(-j \times (B_i \times (B_{i-1} B_{i-2} \ldots B_0) \times r^{(s-i)}) \times 2pi/N)]$. The short DFT sequence calculator 826 is further configured to perform the short DFT sequence calculation on the treated sequence. Then a second multiplier 828 is configured to modify the data after DFT calculation with a second modifying factor, wherein the second modifying factor is represented as $\exp[(j \times (B \times k)_r \times 2pi/r) + (-j \times (B \times B)_r \times 2pi/r)]$, wherein $B = (\Sigma B_s)_r$, $(s \neq i-1)$, i represents a stage of FFT/IFFT calculation, and the data have an address of $B_{s-1} B_{s-2} B_i \ldots B_1 B_0$, and $Bi = 0, 1, 2 \ldots r-1$, r represents the radix of FFT calculation, each of $B_{s-1}$, $B_{s-2}$, $B_1$, $B_0$ is a radix-based digit, and N represents a number of points of FFT/IFFT calculation.

Figure 9:
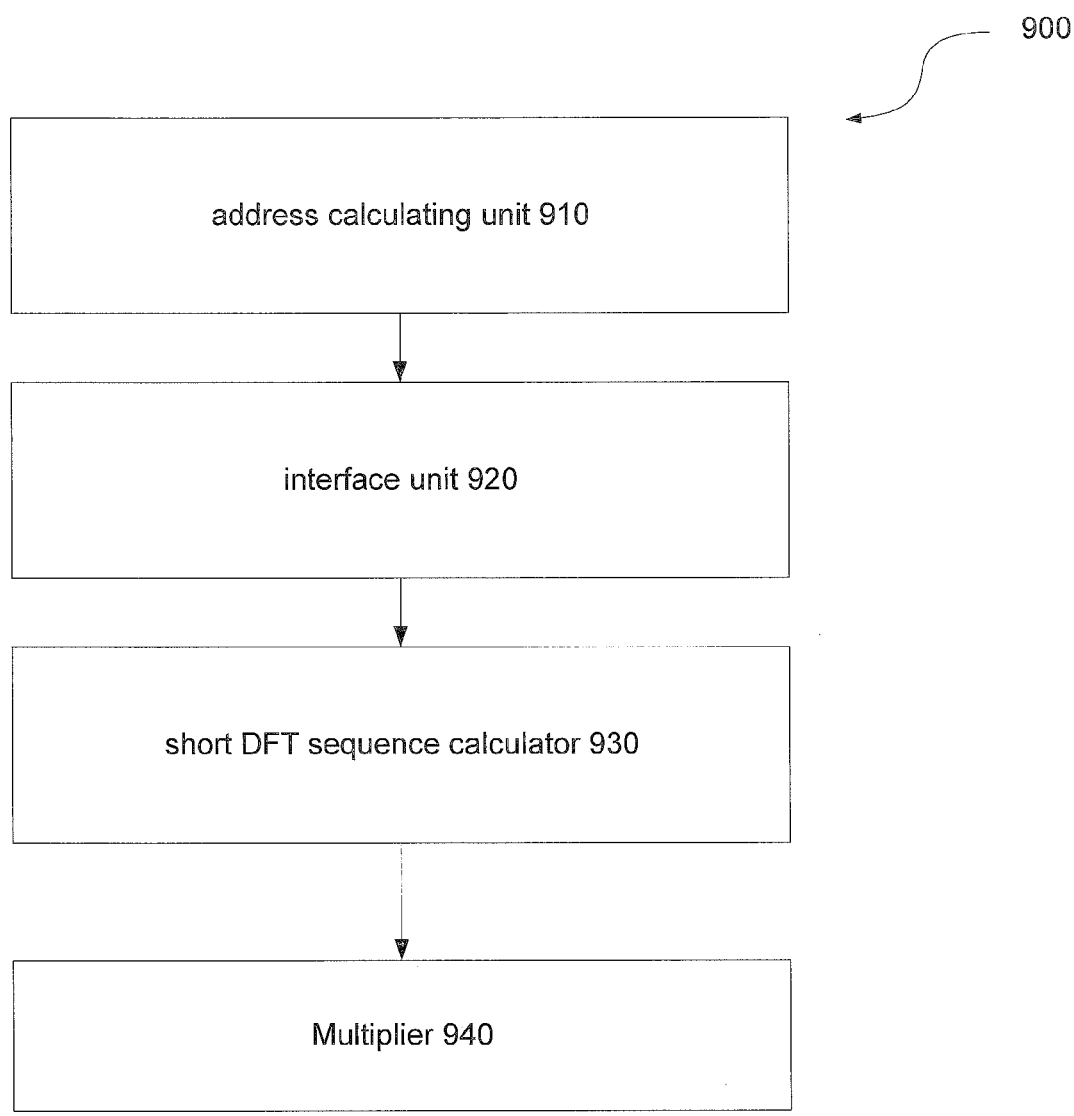
FIG. 9 is a block diagram illustrating a circuit according to another embodiment of the invention.

Alternatively, FIG. 9 is a block diagram illustrating a circuit 900 according to another embodiment of the invention. An address calculating unit 910, an interface unit 920 and an short DFT sequence calculator 930 in circuit 900 shown in FIG. 9 are respectively similar to the address calculating unit 810, the interface unit 820 and the short DFT sequence calculator 826 shown in FIG. 8, therefore their descriptions are omitted. In addition to the address calculating unit 910, the interface unit 920 and the short DFT sequence calculator 930, the circuit 900 further comprises a multiplexer 940, configured to modify the data calculated by the short DFT sequence calculation with the modified twiddle factor, wherein the modified twiddle factor is represented as $\exp[(-j \times (B_{i+1} \times (B_i B_{i-1} \ldots B_1 B_0) \times r^{(s-i)}) \times 2pi/N) + (j \times (B \times k)_r \times 2pi/r) + (j \times (C \times n)_r \times 2pi/r) + (-j \times (B \times B)_r \times 2pi/r)]$, wherein $B = (\Sigma B_s)_r$, $(s \neq i-1)$, $C = (\Sigma B_s)_r$, $(s \neq i)$, i represents a stage of FFT/IFFT calculation, the data have an address of $B_{s-1} B_{s-2} B_i \ldots B_1 B_0$, and $Bi = 0, 1, 2 \ldots r-1$, r represents the radix of FFT/IFFT calculation, each of $B_{s-1}$, $B_{s-2}$, $B_1$, $B_0$ is a radix-based digit, and N represents the number of points of FFT/IFFT calculation.

Alternatively, the twiddle factor can be represented as $\exp[(-j \times (B_{i+1} \times (B_i B_{i-1} \ldots B_1 B_0))]$, and a list between values of twiddle factors and index is stored in the memory, and the circuit further comprises a modifying unit configured to obtain an updated index by adding a higher R bits of the twiddle factor with a modified value, wherein the updated index corresponds to the modified twiddle factor, and modify the data after DFT calculation with the modified twiddle factor, wherein R is represented as log 2(r), which is the logarithm of r to base 2, and r represents a radix of a FFT calculation.

Alternatively, the set of data comprises data to be computed for a first stage of FFT/IFFT calculation, and the circuit comprises a weighing unit configured to weigh the data with an equation of $\exp(j \times (C \times n)_r \times 2pi/r)$, wherein $n = B_0$, $C = (\Sigma B_s)$, $(s \neq 0)$ during inputting, wherein the data have an address of $B_{s-1} B_{s-2} B_i \ldots B_1 B_0$, and $Bi = 0, 1, 2 \ldots r-1$, r represents a radix of FFT/IFFT calculation, each of $B_{s-1}$, $B_{s-2}$, $B_1$, $B_0$ is a radix-based digit, and N represents the number of points of FFT/IFFT calculation.

Alternatively, the FFT/IFFT calculation has a length of an integer power of 2.

Alternatively, the FFT/IFFT calculation includes performing a FFT/IFFT butterfly calculation.

At least some of the embodiments of the present invention may eliminate data reordering process. It can be clearly seen that, the number of gating logic is proportional to data bitwidth, and has exponential relationship with the radix. The advantages of embodiments of the invention will be more prominent when bigger data bitwidth and larger radix are used, for example:

The critical path timing: The most critical and most complex main data path is from the memory through the FFT/IFFT calculation unit to memory. Usually the structure of the assembly line is adopted, while the embodiments of the invention may save two stages of pipelines.

Area of the circuit: The embodiments of the present invention eliminate selecting circuit (MUX), which eliminate many components. Equivalent 2-to-1 selectors are reduced by (r−1)×2W×r (r for radix, and W for data bit-width). For example, the r8-FFT data has a bitwidth of 16 bits, therefore a total of (8−1)×2×16×8=1792 selectors are reduced. The path is shorter, and the area is further optimized.

Layout and wiring: the upper four layers of the memories may not be able to deploy wiring in some practical designs. However, memory is the resource that is highly multiplexed. The embodiments of the invention may effectively reduce wirings near the memory, which makes it easier for layout and wiring. The advantage is more obvious in the Field Programmable Gate Array (FPGA) design, because the FPGA uses fixed lines, and more lines will deteriorate the timing rapidly.

Cost: From the mathematical point of view, embodiments of the invention may need to correct data for each time in order to get the correct results. However in practical designs, three complex multiplications are combined with the original twiddle factor multiplier, which only needs revise a look-up table address with a R bit addition, without introducing any calculation error, and the implementation is more concise and convenient. Specifically, after normalization. W values, that is, exp(i×2pi/N) i=0, 1, . . . N−1 are all stored in a table. Then, the value of W is obtained by using the index of the W in the table, rather than using direct multiplication calculation. Therefore, each time only the W index needs to be obtained from the look-up table. For example, when the product of any combinations of $W_0$, $W_1$, $W_2$ . . . $W_q$ is needed, it is equivalent to obtain a value corresponding to the sum of corresponding index $I_0, I_1, I_2 \ldots I_q$. The extra cost for the above calculation is small, since there is only adding operation and no multiplication operation.

According to at least one embodiment, the data obtained by modulo addition or modulo subtraction have the features of both mutual exclusivity and cyclic shift.

According to at least one embodiment, by adding a modifying factor, all the selection units may be removed.

According to at least one embodiment, by restructuring the memory and the calculation unit, the resources consumed by the modifying factor may be negligible, without affecting the precision of calculation.

Although the present invention has been described with reference to specific exemplary embodiments, the present invention is not limited to the embodiments described herein, and it can be implemented in form of modifications or alterations without deviating from the spirit and scope of the appended claims. Accordingly, the description and the drawings are to be regarded in an illustrative rather than a restrictive sense.

From the foregoing, it will be appreciated that specific embodiments of the technology have been described herein for purposes of illustration, however various modifications can be made without deviating from the spirit and scope of the present invention. Accordingly, the present invention is not restricted except in the spirit of the appended claims.

Other variations to the disclosed embodiments can be understood and effected by those of ordinary skill in the art in practicing the claimed invention, from a study of the drawings, the disclosure, and the appended claims. In the claims the word "comprising" does not exclude other elements or steps, and the indefinite article "a" or "an" does not exclude a plurality. Even if particular features are recited in different dependent claims, the present invention also relates to the embodiments including all these features. Any reference signs in the claims should not be construed as limiting the scope.

Features and aspects of various embodiments may be integrated into other embodiments, and embodiments illustrated in this document may be implemented without all of the features or aspects illustrated or described. One of ordinary skill in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

We claim:

1. A Fast Fourier Transform/Inverse Fast Fourier Transform (FFT/IFFT) method, comprising:
controlling an address calculating unit of a processor to convert a set of reversal-order or a set of natural-order addresses of FFT/IFFT data to a set of addresses in a radix-based numeral representation;
controlling the address calculating unit to calculate sequence numbers of a plurality of memory locations for buffering a set of data for a parallel calculation, by accumulating or subtracting ail digits of the set of addresses in the radix-based numeral representation and then performing a modulo operation on the accumulation or subtraction results, wherein the radix represents a length of short OFT sequence for the parallel calculation in a FFT/IFFT calculation;
controlling an interface unit of the processor to store the FFT/IFFT data simultaneously and respectively into corresponding memory locations indicated by the calculated sequence numbers; and
controlling an FFT/IFFT calculation unit of the processor to perform a FFT/IFFT calculation, comprising:
performing a short DFT sequence calculation, comprising:
retrieving corresponding data from the memory, inputting directly the corresponding data into a short DFT sequence calculator for calculation, modifying the calculated data with a modified twiddle factor, in-place storing the modified data back to the memory directly;
repeating the short DFT sequence calculation, until the whole FFT/IFFT calculation completes.

2. The method of claim 1, wherein the calculated sequence numbers of the plurality of memory locations are cyclical shifts of data sequence numbers used in a short DFT sequence calculation.

3. The method of claim 1, further comprising inputting each modified data for the short DFT sequence calculation directly into an input port corresponding to the FFT/IFFT calculation unit without reordering the data.

4. The method of claim 2, wherein each digit of the set of addresses in the radix-based numeral representation of the data comprises a plurality of bits, wherein before calculating the sequence numbers of a plurality of the memory locations, the method further comprises:
converting each digit by performing XOR operation on two of the plurality of bits of each digit, wherein the calculated sequence numbers of the plurality of memory locations are a part of cyclical shifts of data sequence numbers used in one short DFT sequence calculation.

5. The method of claim 1, wherein performing the short DFT sequence calculation further comprises:
modifying the data to be treated with the short DFT sequence calculation with a first modifying factor, wherein the first modifying factor is represented as $\exp[j\times(B\times n)_r\times 2pi/r]$, $n=0, 1, 2 \ldots r-1$;
treating the modified sequence with a twiddle factor $\exp[(-j\times(B_i\times(B_{i-1}B_{i-2}\ldots B_1 B_0)\times r\hat{}(s-i))\times 2pi/N)]$;
inputting the treated sequence into the short DFT sequence calculator for calculation;
modifying the data after DFT calculation with a second modifying factor, wherein the second modifying factor is represented as $\exp[j\times(B\times k)_r\times 2pi/r)+(-j\times(B\times B)_r\times 2pi/r)]$, wherein $B=(\Sigma B_s)_r$, $(s\neq i-1)$, i represents a stage of FFT/IFFT calculation, the data have an address of $B_{s-1}B_{s-2}B_i \ldots B_1 B_0$, and $Bi=0, 1, 2 \ldots r-1$, r represents a radix of FFT calculation, each of $B_{s-1}$, $B_{s-2}$, $B_1$, $B_0$ is a radix-based digit, and N represents a number of points of FFT/IFFT calculation.

6. The method of claim 1, wherein performing the short DFT sequence calculation, further comprising:
modifying the data calculated by the short DFT sequence calculation with the modified twiddle factor, wherein the modified twiddle factor is represented as $\exp[(-j\times(B_{i+1}\times(B_i B_{i-1} \ldots B_1 B_0)\times r\hat{}(s-i))\times 2pi/N)+(j\times(B\times k)_r\times 2pi/r)+(j\times(C\times n)_r\times 2pi/r)+(-j\times(B\times B)_r\times 2pi/r)]$, wherein $B=(\Sigma B_s)_r$, $(s\neq i-1)$, $C=\Sigma Bs)_r$, $(s\neq i)$, i represents a stage of FFT/IFFT calculation, the data have an address of $B_{s-1}B_{s-2} B_i \ldots B_1 B_0$, and $Bi=0, 1, 2 \ldots r-1$, r represents a radix of FFT/IFFT calculation, each of $B_{s-1}$, $B_{s-2}$, $B_1$, $B_0$ is a radix-based digit, and N represents a number of points of FFT/IFFT calculation.

7. The method of claim 1, wherein a list between values of twiddle factors and index is stored in the memory, and the method further comprises obtaining an updated index by adding a higher R bits of the twiddle factor with a modified value, wherein the updated index corresponds to the modified twiddle factor, and the method further comprises:
modifying the data after DFT calculation with the modified twiddle factor, wherein R is represented as $\log 2(r)$, and r represents a radix of a FFT calculation.

8. The method of claim 1, wherein the set of data comprises data to be computed in a first stage of FFT/IFFT calculation,
Weighing the data with an equation of $\exp(j\times(C\times n)_r\times 2pi/r)$, $n=B_0$, $C=(\Sigma B_s)$, $(s\neq 0)$ during inputting, wherein the data have an address of $B_{s-1}B_{s-2}B_i \ldots B_1 B_0$, and $Bi=0, 1, 2 \ldots r-1$, r represents a radix of FFT/IFFT calculation, each of $B_{s-1}$, $B_{s-2}$, $B_1$, $B_0$ is a radix-based digit, and N represents a number of points of FFT/IFFT calculation.

9. The method of claim 1, further comprising
for each calculation, obtaining data from a memory with a corresponding sequence number according to the sequence number,
inputting the data into ports for short DFT sequence calculator without reordering the data,
outputting, calculation results from the calculator, to corresponding memories according to the sequence number of output ports.

10. The method of claim 1, wherein the FFT/IFFT calculation has a length of an integer power of 2.

11. The method of claim 4, further comprising
reordering the set of data from the corresponding memory locations by a selector, wherein a number of selectable paths of the selector are smaller than the radix of the FFT/IFFT calculation;
wherein performing the FFT/IFFT calculation further comprises performing the short DFT sequence calculation on the set of reordered data.

12. The method of claim 1, wherein performing the FFT/IFFT calculation includes performing a FFT/IFFT butterfly calculation.

13. A circuit for performing Fast Fourier Transform/Inverse Fast Fourier Transform (FFT/IFFT), comprising:
an address calculating unit, configured to convert a set of reversal-order or a set of natural-order addresses of FFT/IFFT data to a set of addresses in a radix-based numeral representation;
wherein the address calculating unit is further configured to calculate sequence numbers of a plurality of memory locations for buffering a set of data for a parallel calculation, by accumulating or subtracting each digit of the set of addresses in the radix-based numeral representation and then preforming a modulo operation on the accumulation or subtraction results, wherein the radix represents a length of short DFT sequence for the parallel calculation in a FFT/IFFT calculation;
an interface unit configured to store the FFT/IFFT data simultaneously and respectively into corresponding memory locations indicated by the calculated sequence numbers; and
a FFT/IFFT calculation unit, configured to perform a FFT/IFFT calculation, comprising
a short DFT sequence calculator configured to:
retrieve corresponding data from the memory, directly perform a short DFT sequence calculation for the data, modify the calculated data with a modified twiddle factor, in-place store the modified data back to the memory directly;
repeat the short DFT sequence calculation, until the whole FFT/IFFT calculation completes.

14. The circuit of claim 13, wherein the calculated sequence numbers of the plurality of memory locations are cyclical shifts of data sequence numbers used in the short DFT sequence calculation.

15. The circuit of claim 13, wherein each modified data for the short DFT sequence calculation are directly inputted into an input port corresponding to the FFT/IFFT calculation unit without reordering the data;
Wherein the circuit does not include a selector.

16. The circuit of claim 14, wherein each digit of the set of addresses in the radix-based numeral representation of the data comprises a plurality of bits, wherein before calculating the sequence numbers of a plurality the memory locations, the circuit further comprises:
a converter, configured to convert each digit by performing XOR operation on two of the plurality of bits of each digit, wherein
the address calculating unit is further configure to calculate sequence numbers of a plurality of memory locations for buffering a set of data for a parallel calculation, by accumulating or subtracting all the converted digits of the set of addresses in the radix-based numeral representation of each data and then modulo the accumulation or subtraction results; wherein the calculated sequence numbers of the plurality of memory locations are a part of cyclical shifts of data sequence numbers used in one short DFT sequence calculation.

17. The circuit of claim 13, further comprising a first multiplier, configured to modify the data to be treated with the short DFT sequence calculation with a first modifying factor, wherein the first modifying is represented as $\exp[(j\times(B\times n)_r\times 2pi/r)]$, n=0, 1, 2 ... r−1;

a twiddling unit, configured to treat the modified sequence with a twiddle factor $\exp[(-j\times(B_i\times(B_{i-1}B_{i-2} \ldots B_1 B_0)\times r\hat{\,}(s-i))\times 2pi/N)]$;

where the short DFT sequence calculator is further configured to perform the short DFT sequence calculation on the treated sequence;

a second multiplier, configured to modify the data after DFT calculation with a second modifying factor, wherein the second modifying factor is represented as $\exp[(j\times(B\times k)_r\times 2pi/r)+(-j\times(B\times B)_r\times 2pi/r)]$, wherein $B=(\Sigma B_s)_r$, (s≠i−1), i represents a stage of FFT/IFFT calculation, the data have an address of $B_{s-1}B_{s-2}B_i \ldots B_1B_0$, and Bi=0, 1, 2 ... r−1, r represents the radix of FFT calculation, each of $B_{s-1}$, $B_{s-2}$, $B_1$, $B_0$ is a radix-based digit, and N represents a number of points of FFT/IFFT calculation.

18. The circuit of claim 13, further comprising:

a multiplexer configured to modify the data calculated by the short DFT sequence calculation with the modified twiddle factor, wherein the modified twiddle factor is represented as $\exp[(-j\times(B_{i+1}\times(B_i B_{i-1} \ldots B_1 B_0)\times r\hat{\,}(s-i))\times 2pi/N)+(j\times(B\times k)_r\times 2pi/r)+(j\times(C\times n)_r\times 2pi/r)+(-j\times(B\times B)_r\times 2pi/r)]$, wherein $B=(\Sigma B_s)_r$, (s≠i−1), $C=(\Sigma B_s)_r$, (s≠i), i represents a stage of FFT/IFFT calculation, the data have an address of $B_{s-1}B_{s-2}B_i \ldots B_1B_0$, and Bi=0, 1, 2 ... r−1, r represents the radix of FFT/IFFT calculation, each of $B_{s-1}$, $B_{s-2}$, $B_1$, $B_0$ is a radix-based digit, and N represents the number of points of FFT/IFFT calculation.

19. The circuit of claim 13, wherein a list between values of twiddle factors and index is stored in the memory, and the circuit further comprises a modifying unit configured to obtain an updated index by adding a higher R bits of the twiddle factor with a modified value, wherein the updated index corresponds to the modified twiddle factor, and modify the data after DFT calculation with the modified twiddle factor, wherein R is represented as $\log 2(r)$, and r represents a radix of a FFT calculation.

20. The circuit of claim 13, wherein the set of data comprises data to be computed for a first stage of FFT/IFFT calculation, and the circuit comprises a weighing unit configured to weigh the data with an equation of $\exp(j\times(C\times n)_r\times 2pi/r)$, wherein $n=B_0$, $C=(\Sigma B_s)$, (s≠0) during inputting, wherein the data have an address of $B_{s-1}B_{s-2}B_i \ldots B_1B_0$, and Bi=0, 1, 2 ... r−1, r represents a radix of FFT/IFFT calculation, each of $B_{s-1}$, $B_{s-2}$, $B_1$, $B_0$ is a radix-based digit, and N represents the number of points of FFT/IFFT calculation.

21. The circuit of claim 13, wherein the interface unit is further configured to for each calculation, obtain a data from a memory with a corresponding sequence number according to the sequence number, inputting the data into ports for short DFT sequence calculator from ports of the short DFT sequence calculator without reordering the data, and output, calculation results from the calculator, to corresponding memories according to the sequence number of output ports.

22. The circuit of claim 13, wherein the FFT/IFFT calculation has a length of an integer power of 2.

23. The circuit of claim 16, further comprising a selector configured to reorder the set of data from the corresponding memory locations, wherein a number of selectable paths of the selector are smaller than the radix of the FFT/IFFT calculation;

wherein the FFT/IFFT calculation unit is further configured to perform the FFT/IFFT calculation on the set of reordered data.

24. The circuit of claim 13, wherein performing the FFT/IFFT calculation includes performing a FFT/IFFT butterfly calculation.

25. A receiver including circuit for performing Fast Fourier Transform/Inverse Fast Fourier Transform (FFT/IFFT) according to claim 13.

26. A Signal generator including circuit for performing Fast Fourier Transform/Inverse Fast Fourier Transform (FFT/IFFT) according to claim 13.

27. A non-transitory computer-readable medium comprising instructions executable by at least one processor to perform a method comprising:

controlling an address calculating unit of the at least one processor to convert a set of reversal-order or set of natural-order addresses of FFT/IFFT data to set of addresses in a radix-based numeral representation;

controlling the address calculating unit to calculate sequence numbers of a plurality of memory locations for buffering a set of data for a parallel calculation, by accumulating or subtracting all digits of the set of addresses in the radix-based numeral representation and then performing a modulo on the accumulation or subtraction results, wherein the radix represents a base for a length of short DFT sequence for the parallel calculation in a FFT/IFFT calculation;

controlling an interface unit of the at least one processor to store the FFT/IFFT data simultaneously and respectively into the corresponding memory locations indicated by the calculated sequence numbers; and controlling an FFT/IFFT calculation unit of the at least one processor to perform FFT/IFFT calculation, comprising performing a short DFT sequence calculation, comprising:

retrieving corresponding data from the memory, inputting directly the corresponding data into a short DFT sequence calculator for calculation, modifying the calculated data with a modified twiddle factor, in-place storing the modified data back to the memory directly;

repeating the short DFT sequence calculation, until the whole FFT/IFFT calculation completes.

* * * * *